United States Patent [19]

Hertler

[11] 4,251,421
[45] Feb. 17, 1981

[54] COATING COMPOSITIONS CONTAINING POLYMERS WITH ISOCYANO GROUPS AND NICKEL OLIGOMERIZATION CATALYSTS

[75] Inventor: Walter R. Hertler, Kennett Square, Pa.

[73] Assignee: E. I. Du Pont de Nemours and Company, Wilmington, Del.

[21] Appl. No.: 108,842

[22] Filed: Dec. 31, 1979

[51] Int. Cl.$^3$ .................... C08G 18/82; C08G 18/83; C08F 8/42; C08K 5/10
[52] U.S. Cl. .................... 260/31.2 N; 260/31.6; 260/31.8 M; 260/31.8 S; 260/31.8 N; 260/31.8 T; 260/31.8 XA; 260/32.4; 260/32.6 N; 260/32.6 NR; 260/32.6 NA; 525/123; 525/128; 525/131; 525/370; 525/371; 525/467; 525/452; 525/377
[58] Field of Search ............... 525/370, 371, 123, 128, 525/131; 528/46, 47; 260/31.2 N, 31.6, 31.8 M, 32.4, 32.6 N, 32.6 NA

[56] References Cited

U.S. PATENT DOCUMENTS

| | | | |
|---|---|---|---|
| 3,277,033 | 10/1966 | Ugi | 260/18 |
| 3,285,992 | 11/1966 | Ugi et al. | 260/857 |
| 3,330,810 | 7/1967 | Bonin et al. | 260/75 |
| 3,544,541 | 12/1970 | Edwards et al. | 525/371 |
| 3,663,469 | 5/1972 | Weissmahr | 525/131 |
| 4,138,376 | 2/1979 | Nicks | 525/131 |
| 4,143,091 | 3/1979 | Chang et al. | 525/131 |

OTHER PUBLICATIONS

"Chemically Modified Nylons" by Goldstein et al., J. Biochem. (1974), 143, pp. 497–509, G. Britain.
"Isocyanmethyl–Polystyrol" by Skorna et al., Verlag Chemie, GmbH, D-6940 Weinheim, 1978.

Primary Examiner—William F. Hamrock

[57] ABSTRACT

This invention relates to cross-linkable film-forming compositions which contain a polymer with pendant isocyano groups and a nickel oligomerization catalyst and to the use of the compositions in ambient temperature-cure finishes.

13 Claims, No Drawings

COATING COMPOSITIONS CONTAINING POLYMERS WITH ISOCYANO GROUPS AND NICKEL OLIGOMERIZATION CATALYSTS

BACKGROUND OF THE INVENTION

Polymers which contain pendant isocyano groups are known in the art. Ugi, U.S. Pat. No. 3,277,033, discloses preparation of a polyamide by reaction of a carboxylic acid, an amine, a carbonyl compound and an isonitrile. Polymeric as well as monomeric isonitriles are disclosed as being operable. A similar disclosure to the use of bifunctional and polymeric isonitriles is contained in Ugi et al., U.S. Pat. No. 3,285,992, drawn to the preparation of a polyester amide by reaction of a carboxyl-containing polymer with an isonitrile and a carbonyl group-containing compound.

Bonin et al., U.S. Pat. No. 3,330,810, disclose the reaction of difunctional and/or polyfunctional isonitriles, including polymers which contain isocyano groups, with carboxyl-containing polymers to produce cross-linked plastics.

Skorna et al., Chem. Ber. 111, p. 806–810 and p 3965–3968 (1978), describe the introduction of isocyano groups onto a cross-linked polystyrene resin; and Goldstein et al., Biochem J. 143, p 497–509 (1974), describe the preparation of a nylon-type polymer which contains pendant isocyano groups.

SUMMARY OF THE INVENTION

The present invention relates to a cross-linkable film-forming composition consisting essentially of:

(1) about 15 to about 80 percent by weight of said composition a soluble polymer having a number average molecular weight of about 500 to about 50,000, said polymer containing at least about 1.5 isocyano groups per polymer chain;

(2) about 0.001 to about 1 percent by weight of said polymer of a nickel catalyst selected from the group consisting of nickel (II) salts, nickel (0) complexes and nickel (II) complexes; and (3) about 19 to about 84 percent by weight of said composition of a solvent for the polymer.

The cross-linkable film-forming compositions of the invention are particularly useful as finishes, e.g., as automotive enamel primers, and are curable at ambient temperature. Low temperature curing of finishes is desirable both for reasons of economy and efficiency.

DETAILED DESCRIPTION OF THE INVENTION

One of the essential ingredients in the compositions of the invention is a soluble polymer having a number average molecular weight, Mn, of about 500 to about 50,000 and preferably about 1500 to about 25,000. The polymer must contain an average of at least about 1.5 isocyano groups per polymer chain in order to obtain satisfactory cross-linking of the chains in the presence of a nickel catalyst. There is no maximum number of isocyano groups which can be present, but it is preferred that the polymer contain an average of about 3 to about 6 isocyano groups per polymer chain for optimum cross-linking efficiency. The amount of polymer present in the composition should be about 15 to about 80 percent by weight and preferably about 30 to about 60 percent by weight of the composition.

The polymer backbone structure to which isocyano groups are attached is not critical, and a large variety of soluble polymeric structures can be employed. For example, polymers which contain isocyanato groups such as those prepared by reaction of a diisocyanate with a polymeric polyol, or polymers prepared by co-polymerization of 2-isocyanatoethyl methacrylate with any of a variety of well-known ethylenically unsaturated compounds as shown in Examples 1, 3 and 9 below, may be treated with a hydroxy isocyanide, e.g., 6-hydroxyhexyl isocyanide, to obtain a polymer containing pendant isocyano groups. Alternatively, copolymerization of an isocyano-containing monomer, e.g., 2-isocyanoethyl methacrylate, with an ethylenically unsaturated compound will provide the desired isocyano group-containing polymer directly. This method is exemplified in Example 4 below. Applicant's preferred method for the preparation of a polymer with isocyano groups is the direct reaction of an isocyanato isocyanide with a hydroxyl-containing polymer, as shown in Example 15 below.

U.S. Pat. Nos. 3,277,033, 3,285,992, and 3,330,810, disclose additional types of polymers with pendant isocyano groups, and additional useful polymers and methods for their preparation will be apparent to those skilled in the art.

Another essential ingredient in the compositions of the invention is a nickel catalyst capable of catalyzing cross-linking of the polymer chains through pendant isocyano groups. Suitable catalysts include nickel(II) salts, nickel(II) complexes and nickel (0) complexes.

Suitable nickel(II) salts include nickel(II) chloride, nickel(II) nitrate, nickel(II) sulfate, nickel(II) acetate, nickel(II) oxalate, nickel(II) bromide and nickel(II) iodide.

Suitable nickel (O) and nickel (II) complexes include nickel(O)tetrakis(trimethyl phosphite), nickel(O)tetrakis(6-hydroxyhexyl isocyanide), nickel(O)bis(1,5-cyclooctadiene) complex, nickel(O)(1,5,9-dodecadiene) complex, nickel(O) (cyclooctatetraene) complex, nickel(II) acetyacetonate, nickel(II) cyclohexyl butyrate, dicrotylnickel(II), diallylnickel(II), dimethallylnickel(II), and crotyl-, allyl-, methallylnickel(II) dichloride, dibromide and diiodide, nickel(O)tetrakis(triphenyl phosphine), and nickel(O)tetrakis(trimethyl phosphine).

The amount of nickel catalyst employed can be very small and is dependent upon the number of pendant isocyano groups present in the polymer. To achieve effective cross-linking, it is preferred that at least about 0.0009 mole of nickel for each 100 moles (9 ppm) of pendant isocyano groups be present. More preferably, the amount of nickel-containing catalyst is about 0.05 to about 0.2 percent by weight based on the isocyano-containing polymer.

Another essential ingredient in the compositions of the invention is a solvent for the isocyano-containing polymer. The solvent may be a single solvent, or a mixture of solvents. Suitable solvents include any of a variety of organic liquids including esters, ethers, aromatic and aliphatic hydrocarbons including halogenated hydrocarbons, ketones, amides, and alcohols.

Examples of suitable solvents include toluene, the xylenes, chlorobenzene, o-dichlorobenzene, 1,1,1-trichloroethane, methylene chloride, chloroform, 1,1,2-trichloroethane, 1,1,2-trichloroethylene, methylcyclohexane, ethyl acetate, n-butyl acetate, tetrahydrofuran, 1,2-dimethoxyethane, 2-ethoxyethyl acetate, dioxane, acetone, 2-butanone, 3-pentanone, N,N-dimethylformamide, 2-butoxyethanol, 2-ethoxyethanol, N,N-dimethylacetamide, and N-methylpyrrolidone; and mixtures of these solvents in various proportions as may be required to attain solution.

The quantity of solvent required for the composition is that necessary to achieve solution of the polymer and to produce the desired solution viscosity for the coating method to be employed. Generally the solvent comprises about 19 to about 84 percent by weight and preferably about 39 to about 69 percent of the cross-linkable composition.

In addition to the essential components of the film-forming composition, it is sometimes desirable to include certain optional components which provide for improved properties and/or processing of the compositions. For example, when a very low level of nickel catalyst is used, addition of a nonpolymeric diisocyanide results in a faster and more effective cure of the composition. The particular diisocyanide employed is not critical and any of a variety of known diisocyanides may be used, for example those diisocyanides disclosed in U.S. Pat. No. 3,330,810, Column 4, lines 34–52. Dodecamethylene diisocyanide is specifically exemplified in Example 7. It is preferred to use about 12 to about 17 percent by weight of the diisocyanide based on the soluble polymer, component (1).

Organic plasticizers can also be used in the film-forming compositions of this invention in amounts of about 1 to about 20 percent by weight based on the weight of components (1) and (2). Monomeric and polymeric plasticizers can be used such as phthalate ester plasticizers, and in particular, alkyl and cycloalkyl ester phthalates in which the alkyl groups have 2–10 carbon atoms such as dioctyl phthalate, didecyl phthalate, butyl benzyl phthalate, dicyclohexyl phthalate and mixtures thereof. Epoxidized soya bean oil, oil free and oil modified alkyds can also be used as plasticizers. Polyester resins such as alkylene glycol esters of adipic and benzoic acid, for example, ethylene glycol adipate benzoate, neopentyl glycol adipate benzoate, ethylene glycol adipate benzoate phthalate, can also be used.

The film-forming compositions used in this invention can be pigmented. Typical pigments which can be used are metallic oxides, preferably titanium dioxide, zinc oxide, iron oxide, and the like, metallic flakes, such as aluminum flake, metallic powders, metallic hydroxides, "Afflair" pigments, i.e., mica coated with titanium dioxide, sulfates, carbonates, carbon blacks, silica, talc, china clay and other pigments, organic dyes and lakes.

The film-forming compositions may also contain a pigment dispersant, i.e., a polymer compatible with the pigment and with the soluble polymer, component (1), which aids in incorporating the pigment into the composition.

Other compatible resins, such as vinyl chloride copolymers, polyurethanes, cellulose acetate butyrate, and silicone resins, can be incorporated into the film-forming compositions of this invention. Also ultraviolet light stabilizers and antioxidants can be incorporated into the compositions.

The novel film-forming compositions can be applied to a variety of substrates such as glass, plastics, metals such as aluminum, steel and the like, by the usual methods such as brushing, dipping, roller coating, flow coating, coil coating, spraying, drawing down, and the like. The films are preferably crosslinked at about ambient temperature.

The following are illustrative examples of the invention in which all parts and percentages are by weight and all degrees are Celsius unless otherwise stated.

Hardness was measured by a Tukon Micro-hardness tester, Model FB, Wilson Mechanical Instruments Division, American Cable Company, with a 25-gram load. The units of hardness (Knoop Hardness Number, KHN) relate to the length of indentation of a pyramidal-shaped diamond tip on the test surface under an applied load.

Coatings were prepared by drawdown with a suitable doctor knife.

Acetone-solubility of the coatings was determined by rubbing the coating with an applicator soaked in acetone, and examining the coating for indication of dissolution.

EXAMPLE 1

Copolymer of Styrene and An Isocyano-Substituted Methacrylate

To 20 g of a 54.96% solids solution of copoly-(styrene, 2-isocyanatoethyl methacrylate), $Mn \sim 1500$; $Mw \sim 4800$, in a 30:70 mixture of 2-ethoxyethyl acetate-/ethyl acetate which contained 6.87% isocyanate based on the solution was added 4.155 g of 6-hydroxyhexyl isocyanide and 0.5 ml of a 1% solution of dibutyltin dilaurate in toluene. The solution was stirred at reflux temperature for 2 hours to complete the reaction. The infrared spectrum of the solution of copoly(styrene, 3-aza-4-keto-5-oxa-11-isocyanoundecyl methacrylate) showed the absence of isocyanate absorption whereas isonitrile absorption at 2150 cm$^{-1}$ remained. The broad O—H stretch absorption was replaced with sharp N—H absorption.

Solvent was removed at reduced pressure from a sample of the reaction mixture and the residual copolymer product was analyzed.

Anal. Calcd for $(C_8H_8)_{1.4}(C_{14}H_{22}N_2O_4)$: C, 70.69; H, 7.82; N, 6.54 Found: C, 70.06; H, 8.10; N, 6.23. C, 70.00; H, 8.08; N, 6.29.

Molecular weight was determined by gel permeation chromatography using a polymethyl methacrylate standard: Mn 2100; Mw 6700.

The 6-hydroxyhexyl isocyanide used in the preparation of the isocyano copolymer was synthesized as follows: To 214.4 g (2 moles) of 6-aminohexyl alcohol, which was stirred and heated to keep the material molten, was added dropwise 120.1 g (2 moles) of methyl formate. When the addition was completed, the mixture was stirred and heated at reflux for two hours. After removal of the methanol formed in vacuo, the residue was recrystallized from tetrahydrofuran to give 237.4 g of 6-hydroxyhexylformamide, m.p. 43.5°–45°.

Anal. Calcd for $C_7H_{15}NO_2$: C, 57.90; H, 10.41; N, 9.65 Found: C, 57.19; H, 9.95; N, 9.29. C, 57.17; H, 10.21; N, 9.29.

To a stirred solution of 145.2 g of 6-hydroxylhexylformamide in 500 ml of anhydrous triethylamine and 835 ml of anhydrous methylene chloride was added dropwise 108.7 g (1 mole) of chlorotrimethylsilane. After stirring at reflux for 30 minutes, 100 g of phosgene was added from a cold trap while the stirred reaction mixture was permitted to reflux under a Dry Ice-cooled condenser. Then cold water was added, and the organic layer was washed with aqueous sodium bicarbonate, dried, and evaporated to leave 203 g of dark liquid 6-trimethylsiloxyhexyl isocyanide which was not purified, but used directly in the next step.

A mixture of 101 g of 6-trimethylsiloxyhexyl isocyanide and 1 liter of methanol was stirred for one hour at reflux. Because infrared spectroscopy indicated that no change had occurred, 0.5 g of acidic ion-exchange resin catalyst was added, and the reaction mixture was heated at reflux for two hours. The mixture was filtered and the filtrate was concentrated in vacuo. The liquid residue was dissolved in ether and passed through neutral alumina to give, after evaporation of the ether, 52.5 g of 6-hydroxyhexyl isocyanide as a liquid.

Anal. Calcd for $C_7H_{13}NO$: C, 66.10; H, 10.30; N, 11.02 Found: C, 65.05; H, 10.35; N, 10.24. C, 65.35; H, 10.43; N, 10.55.

EXAMPLE 2

Copolymer of Butyl Acrylate and An Isocyano-Substituted Methacrylate

A mixture of 40 g of a 69.48% solids solution of copoly(butyl acrylate, 2-isocyanatoethyl methacrylate), $Mn=2100$; $Mw=6500$, prepared by copolymerization of 45.7 parts of isocyanatoethyl methacrylate, 45.4 parts of butyl acrylate, 6.7 parts of lauryl mercaptan and 2.2 parts of azobisisobutyronitrile, in a 30:70 solvent mixture of 2-ethoxyethyl acetate/ethyl acetate, 10.4 g of 6-hydroxyhexyl isocyanide and 0.5 ml of a 1% solution of dibutyltin dilaurate in toluene was stirred at reflux for 1.5 hours. Infrared spectroscopy showed that reaction of the isocyanate group was incomplete. After addition of 0.2 ml of 1% triethylamine in toluene followed by addition of two 0.1-ml portions of 6-hydroxyhexyl isocyanide to the refluxing solution, infrared spectroscopy showed that no isocyanate remained. The infrared spectrum was consistant with copoly(butyl acrylate, 3-aza-4-keto-5-oxa-11-isocyanoundecyl methacrylate).

EXAMPLE 3

Copolymer of Styrene/Butyl Acrylate/Isocyano-Substituted Methacrylate

A mixture of 80 g of a 54.6% solids solution of copoly(styrene, butyl acrylate, 2-isocyanatoethyl methacrylate, in the ratio 32.96:10.2:45.99) $Mn \sim 1500$; $Mw \sim 5000$, in a 30:70 mixture of 2-ethoxyethyl acetate/ethyl acetate, 16.4 g of 6-hydroxyhexyl isocyanide and 1 ml of a 1% solution of dibutyltin dilaurate in toluene was stirred at reflux for one hour. Infrared spectroscopy indicated that the resulting copoly(styrene, butyl acrylate, 3-aza-4-keto-5-oxa-11-isocyanoundecyl methacrylate) product was nearly free of isocyanate. The solids content of the product solution was 62.43%.

EXAMPLE 4

Copolymer of Butyl Methacrylate and 2-Isocyanoethyl Methacrylate

A mixture of 26 g of butyl methacrylate, 5 g of 2-isocyanoethyl methacrylate, 56 g of methyl ethyl ketone, and 0.279 g of $\alpha,\alpha'$-azobis(isobutyronitrile) was stirred at reflux under a nitrogen atmosphere for 100 minutes. The resulting viscous solution of copoly(butyl methacrylate, 2-isocyanoethyl methacrylate) had a solids content of 29.76%.

Anal. Calcd for $(C_8H_{14}O_2)_5(C_7H_9NO_2)$: C, 66.40; H, 9.37; N, 1.65 Found: C, 65.97; H, 9.15; N, 1.17. C, 65.93; H, 9.08; N, 1.18.

The 2-isocyanoethyl methacrylate used in this preparation was prepared as follows. To a stirred refluxing solution of 44.6 g of 2-hydroxyethylformamide (prepared by the reaction of methyl formate with 2-aminoethanol) in 250 ml of anhydrous triethylamine and 417 ml of anhydrous methylene chloride was added dropwise 52.27 g of methacrylyl chloride. When addition was completed, the water-cooled condenser was replaced with a Dry Ice-cooled condenser, and 50 g of phosgene was added by distillation from a cold trap while the reaction mixture was stirred at reflux. The mixture was cooled, treated with cold water, and the organic layer was washed with sodium bicarbonate solution, dried ($Na_2SO_4$), and concentrated in vacuo. Distillation of the product in a molecular still gave 12.2 g of 2-isocyanoethyl methacrylate, b.p. 83°–101°/3 μm.

Anal. Calcd for $C_7H_9NO_2$: C, 60.42; H, 6.51; N, 10.07. Found: C, 55.57; H, 6.60; N, 9.18. C, 55.65; H, 6.63; N, 9.19:

The 60 MHz $H^1$ nmr spectrum of the product showed a multiplet at 1.85 Hz (3H, $CH_3$), a triplet at 3.62 Hz ($J=5$, 2H, $CH_2$), a multiplet at 4.25 Hz (2H, $CH_2$), a multiplet at 5.55 (1H, vinyl H), and a multiplet at 6.09 Hz (1H, vinyl H) in agreement with the assigned structure.

EXAMPLE 5

Coating Composition: Copoly(styrene, 3-aza-4-keto-5-oxa-11-isocyanoundecyl methacrylate)/Nickel Tetrakis(trimethyl phosphite)

A. A mixture of 2.5 g of copoly(styrene, 3-aza-4-keto-5-oxa-11-isocyanoundecyl methacrylate) solution, prepared as described in Example 1, 2.5 g of a solution (63.4% solids) of a tetrapolymer of styrene, methyl methacrylate, stearyl methacrylate and hydroxyethyl acrylate, $Mw=15,000$, in an 83:17 solvent mixture of 2-ethoxyethyl acetate/naphtha, 0.05 ml of a 1% solution of dibutyltin dilaurate in toluene, and 0.2 ml of a 1% solution of nickel tetrakis(trimethyl phosphite) in toluene was coated on a glass plate. After two days, the coating remained soluble in acetone and had a Tukon hardness of 2 KHN (3.2 KHN after 8 days). The coating solution gelled on standing. A similar coating which contained no nickel catalyst was cloudy, remained soluble in acetone, and had a 2-day Tukon hardness 2 KHN.

B. A mixture of 2 g of the copoly(styrene, 3-aza-4-keto-5-oxa-11-isocyanoundecyl methacrylate) solution of Part A, 0.01 ml of a 1% solution of dibutyltin dilaurate in toluene, and 0.1 ml of a 1% solution of nickel tetrakis(trimethyl phosphite) in toluene was coated on glass. After two days the clear yellow coating was insoluble in acetone and had a Tukon hardness of 3.37 KHN (after 8 days, 6.1 KHN).

EXAMPLE 6

Coating Composition: Copoly(styrene, butyl acrylate, 3-aza-4-keto-5-oxa-11-isocyanoundecyl methacrylate)/Nickel Tetrakis(6-hydroxyhexyl isocyanide)

Coatings on glass were prepared using the copolymer solution of polymeric isocyanide of Example 3 in accordance with Table I. Clear, glossy, yellow coatings were obtained.

TABLE I

| Polymeric Isocyanide Solution | Dodecamethylene | 1% Nickel Tetrakis (6-hydroxyhexyl isocyanide)[2] |
| --- | --- | --- |

TABLE I-continued

| Example | (Ex. 3) g | Diisocyanide[1] g | in ethanol ml | Gel Time hr |
|---|---|---|---|---|
| 6A | 1 | 0 | 0.02 | 1 |
| 6B | 1 | 0.1 | 0.02 | 1 |
| 6C | 1 | 0.1 | 0.05 | 1 |

| | Acetone Solubility of Coating | | |
|---|---|---|---|
| Example | 1 day | 2 days | 14-Day Tukon Hardness |
| 6A | swollen | insol. | 2.98 KHN |
| 6B | insol. | insol. | 3.02 KHN |
| 6C | insol. | insol. | 3.04 KHN |

[1]Dodecamethylene diisocyanide was prepared by reaction of dodecamethylene bis(formamide) with phosgene and triethylamine in dichloromethane solvent, and it was purified by distillation, b.p. 94°/0.15 mm.
[2]Nickel tetrakis(6-hydroxyhexyl isocyanide) was prepared by reaction of nickel(0) bis(1,5-cyclo-octadiene) with four equivalents of 6-hydroxyhexyl isocyanide. The product, after removal of cyclo-octadiene at reduced pressure, was obtained as a dark oil. The ethanol solution was freshly prepared before use.

EXAMPLE 7

Coating Composition: Copoly(styrene, butyl acrylate, 3-aza-4-keto-5-oxa-11-isocyanoundecyl methacrylate)/Nickel Tetrakis(trimethyl phosphite)

Coatings on glass were prepared with a 5 mil (127 μm) doctor knife from a mixture of 2 g of the copolymer solution of polymeric isocyanide of Example 3, 0.2 g of dodecamethylene diisocyanide, and an amount of nickel tetrakis(trimethyl phosphite) catalyst as shown in Table II. All of the coatings turned yellow and exhibited some wrinkling.

TABLE II

| Example | 1% Nickel Tetrakis (trimethyl phosphite in toluene ml | Gel Time | Acetone Solubility of Coating 18 hr | 2 days |
|---|---|---|---|---|
| 7A | 0.05 | <18 hr. | insol. | insol. |
| 7B | 0.02 | <18 hr. | insol. | insol. |
| 7C | 0.01 | <18 hr. | insol. | insol. |
| 7D | 0.005 | >18 hr. | soluble | insol. |

EXAMPLE 8

Coating Composition: Copoly(butyl acrylate, 3-aza-4-keto-5-oxa-11-isocyanoundecyl methacrylate/Nickel Tetrakis(trimethyl phosphite)

Coatings on glass were prepared with a 5-mil (127 μm) doctor knife from 2 g of the copolymer solution of polymeric isocyanide of Example 2, 0.1 g of dodecamethylene diisocyanide, and an amount of nickel tetrakis(trimethyl phosphite) catalyst as shown in Table III.

TABLE III

| Example | 1% Nickel Tetrakis (trimethyl phosphite) in toluene ml | Coating Appearance | Acetone Solubility of Coating 1 day | 5 days | Gel Time |
|---|---|---|---|---|---|
| 8A | 0.0025 | yellow, finely wrinkled | insol. | insol. | 1 day |
| 8B | 0.0010 | yellow, clear | swollen | insol. | 1 day |

EXAMPLE 9

Preparation of Copoly(styrene, 3-aza-4-keto-5-oxa-11-isocyanoundecyl methacrylate, 3-aza-4-keto-5-oxatridecyl methacrylate)

To 40 g of a 54.96% solids solution of copoly(styrene, 2-isocyanatoethyl methacrylate), Mn~1500, in a 30:70 mixture of 2-ethoxyethyl acetate/ethyl acetate which contained 6.87% isocyanate based on the solution, was added 2.58 g of 1-octanol, 5.05 g of 6-hydroxyhexyl isocyanide, and 0.5 ml of a 1% solution of dibutyltin dilaurate in toluene. The reaction mixture was stirred at gentle reflux under a nitrogen atmosphere. After 30 minutes, infrared spectroscopy indicated that some isocyanate remained unreacted, and 0.64 g of 1-octanol and 1.26 g of 6-hydroxyhexyl isocyanide were added. Reaction was continued for an additional 30 minutes, and infrared spectroscopy showed all of the isocyanate had reacted. The product was a solution of copoly(styrene, 3-aza-4-keto-5-oxa-11-isocyanoundecyl methacrylate, 3-aza-4-keto-5-oxatridecyl methacrylate) which contained approximately 3.3 isocyano groups per polymer chain.

EXAMPLE 10

Coating Composition: Copoly(styrene, 3-aza-4-keto-5-oxa-11-isocyanoundecyl methacrylate, 3-aza-4-keto-5-oxatridecyl methacrylate)/ Nickel Tetrakis (trimethyl phosphite)

A mixture of 3 g of the copolymer solution of polymeric isonitrile of Example 9 and 0.15 ml of a 1% solution of nickel tetrakis (trimethyl phosphite) in toluene was coated on a steel plate and also on a salt plate for infrared study. The coatings were cured at room temperature. The coating solution gelled in three hours. With curing, the coatings turned yellow and wrinkled. After two days they were insoluble in acetone. Infrared spectroscopy showed a loss of 40% of the isonitrile after 2 days and a 48% loss after 12 days.

EXAMPLE 11

Coating Composition: Copoly(butyl methacrylate, 2-isocyanoethyl methacrylate)/ Nickel Tetrakis (trimethyl phosphite)

A mixture of 3 g of the copolymer solution of polymeric isonitrile of Example 4 and 0.15 ml of a 1% solution of nickel tetrakis (trimethyl phosphite) in toluene was coated on a steel plate, and also on a salt plate for infrared study. The coatings were cured at room temperature. The coating solution gelled in 15 minutes. With curing, the coatings became yellow in color and after two days they were insoluble in acetone. Tukon hardness after 12 days was 7.6 KHN. Infrared spectroscopy showed 27% loss of isonitrile after 2 days, and a 68% loss after 12 days.

EXAMPLE 12

Preparation of Copoly(styrene, butyl acrylate, 3-aza-4-keto-5-oxa-11-isocyanoundecyl methacrylate, 3-aza-4-keto-5-oxatridecyl methacrylate)

A mixture of 30 g of a 54.6% solids solution of copoly(styrene, butyl acrylate, 2-isocyanatoethyl methacrylate, in the ratio 32.96:10.2:45.99), Mn~1500; Mw~5000, in a 30:70 mixture of 2-ethoxyethyl acetate/ethyl acetate, 2.1 g of 6-hydroxyhexyl isocyanide, 4.17 g of 1-octyl alcohol, and 0.5 ml of a 1% solution of dibutyltin dilaurate in toluene was stirred at reflux temperature for 1.5 hours after which time infrared spectroscopy indicated that there was a trace of residual isocyanate. Then 0.41 g of 1-octyl alcohol was added, and heating was continued until no residual isocyanate remained. The product copolymer solution contained 61.17% solids with approximately 1.5 isonitrile groups per polymer chain.

EXAMPLE 13

Coating Composition: Copoly(styrene, butyl acrylate, 3-aza-4-keto-5-oxa-11-isocyanoundecyl methacrylate, 3-aza-4-keto-5-oxatridecyl methacrylate)/ Nickel Tetrakis (trimethyl phosphite)

A mixture of 3 g of the copolymer solution of polymeric isonitrile of Example 12 and 0.15 ml of a 1% solution of nickel tetrakis (trimethyl phosphite) in toluene was coated on a steel plate, and also on a salt plate for infrared study. The coatings were cured at room temperature. The coating solution gelled within 18 hours. With curing, the coatings became wrinkled and very slowly developed a yellow color. They remained soluble in acetone for 8 days, but after 12 days were insoluble in acetone. Infrared spectroscopy showed a loss of 40% of the isonitrile after 2 days, 58% after 5 days, 65% after 9 days, and 70% after 12 days.

EXAMPLE 14

Coating Composition: Copoly(styrene, butyl acrylate 3-aza-4-keto-5-oxa-11-isocyanoundecyl methacrylate, 3-aza-4-keto-5-oxatridecyl methacrylate)/ Nickel Tetrakis (trimethyl phosphite)

The experiment of Example 13 was repeated except that 0.2 g of dodecamethylene diisocyanide was added to the coating composition. After 2.5 days of curing, the coatings were yellow, wrinkled and insoluble in acetone. Infrared spectroscopy showed a loss of 57% of the isocyano groups after 3 days.

EXAMPLE 15

Preparation of 3-isocyanato-1,5,5-trimethyl-1-(2-aza-3-keto-4-oxa-10-isocyanodecyl)cyclohexane and its attachment to a hydroxyl polymer resin A mixture of 2.54 g (0.02 mole) of 6-hydroxyhexyl isocyanide, 37 ml of tetrahydrofuran, 4.45 g of isophorone diisocyanate, and 1 ml of a 1% solution of stannous octoate in toluene was stirred at reflux for 24 hours. The 6-hydroxyhexyl isocyanide was further purified before use by distillation through a Vigreux Column, b.p. 82°/0.4 mm.

Anal. Calcd for $C_7H_{13}NO$: C, 66.10; H, 10.30; N, 11.02 Found: C, 66.06; H, 10.31; N, 11.15.

Infrared spectroscopy showed loss of part of the isocyanate absorption, and loss of all hydroxyl absorption with formation of a new N-H peak, consistent with formation of 3-isocyanato-1,5,5-trimethyl-1-(2-aza-3-keto-4-oxa-10-isocyanodecyl)cyclohexane. To this solution was added 23.8 g of a polymer solution (55% solids) of hydroxylcontaining resin, Mn=1500; Mw=20,000, of the type described in Example 1 of U.S. Pat. No. 3,558,564. The resulting solution was stirred at reflux for 2.5 days without complete consumption of isocyanate (infrared); then 5 g of 2-ethoxyethyl acetate was added, and tetrahydrofuran was removed by distillation. The remaining solution was stirred at 96° for 2.5 hours. Infrared spectroscopy showed a small amount of residual isocyanate in the solution of isonitrile-modified resin; 49.4% solids; Mn~1100; Mw~40,000 (2 peaks).

EXAMPLE 16

Coating Composition: Isonitrile-modified Resin/Nickel/Catalysts

Mixtures of 2 g of the isonitrile-modified resin solution of Example 15 and 0.1 ml of a 1% solution of nickel catalyst were coated on steel panels, and the coated panels were cured at room temperature. The results are summarized in Table IV.

TABLE IV

| Catalyst | $Ni[P(OCH_3)_3]_4$[1] | $Ni[CN(CH_2)_6OH]_4$[2] | None (Control) |
|---|---|---|---|
| Gel time | 2 hrs | 1 hr | no gelation |
| Acetone Solubility 2 hr. | soluble | insoluble | soluble |
| 19 hr. | insoluble | insoluble | soluble |
| Color | yellow | yellow | colorless |
| Appearance 24 hrs. | clear,hard | clear,hard | clear,soft |

[1] The catalyst was dissolved in toluene.
[2] The catalyst was dissolved in ethanol.

EXAMPLE 17

Weatherability Study

A mixture of 5 g of a 63.2% solids solution of copoly(styrene, 3-aza-4-keto-5-oxa-11-isocyanoundecyl methacrylate), prepared as described in Example 1, and 0.25 ml of a 1% solution of nickel tetrakis (trimethyl phosphite) in toluene was coated on steel plates, and also on glass panels. The coatings were cured at room temperature, and after four days the clear yellow coatings were insoluble in acetone. A 6-day aged coating on steel stored for 42 hours in a Cleveland Condensing Humidity Cabinet (manufactured by Q-Panel Co. of Cleveland, Ohio) at 60° showed no whitening or other change. A 6-day aged coating exposed for 570 hours to ultraviolet light in a Q-U-V Accelerated Weathering Tester (manufactured by Q-Panel Co. of Cleveland, Ohio) showed no loss of 60° gloss; the Tukon hardness increased from 9.98 KHN to 26.2 KHN, and yellowness increased. The tensile strength of an 11-day aged coating removed from glass was found to be 3556 psi (24,519 kPa) with 7.5% elongation at break using an Instron tensile tester.

EXAMPLE 18

Coating Composition: Copoly(styrene, butyl acrylate, 3-aza-4-keto-5-oxa-11-isocyanoundecyl methacrylate)/ Nickel (II) Chloride Hexahydrate To 2 g of a copolymer solution of polymeric isocyanide, prepared as described in Example 3 (64.33% solids content) was added 0.05 ml of a 1% solution of nickel (II) chloride hexahydrate in ethanol. The resulting solution was coated on glass and steel panels and the coated panels were cured at room temperature. Gelling of the coating solution occurred in less than 1 hour, and after 4 hours the clear glossy, yellow coatings were insoluble in acetone. After 3 days the Tukon hardness was 6.39 KHN.

In the following claims, the term "consisting essentially of" is used to mean "excluding other elements of any essential significance to the claimed combination."

It is thus intended that the claims may be infringed even though additional components, not mentioned in the claims and which do not affect the basic characteristics of the coating composition, are present in that composition.

What is claimed is:

1. A cross-linkable film-forming composition consisting essentially of:
   (1) about 15 to about 80 percent by weight of said composition of a soluble polymer having a number average molecular weight of about 500 to about 50,000, said polymer containing at least about 1.5 isocyano groups per polymer chain;
   (2) about 0.001 to about 1 percent by weight of said polymer of a nickel catalyst selected from the group consisting of nickel (II) salts, nickel (O) complexes and nickel (II) complexes; and
   (3) about 19 to about 84 percent by weight of said composition of an organic solvent for said polymer.

2. A composition of claim 1 wherein the soluble polymer has a number average molecular weight of about 1500 to about 25,000.

3. A composition of claim 1 wherein the soluble polymer contains at least about 3 to 6 isocyano groups per polymer chain.

4. A composition of claim 1 wherein the soluble polymer constitutes about 30 to about 60 percent by weight of the composition.

5. A composition of claim 1 wherein the soluble polymer is a copolymer of styrene, butyl acrylate, butyl methacrylate, or a combination thereof, with an isocyano-substituted methacrylate.

6. A composition of claim 1 wherein the nickel catalyst is a nickel (O) complex.

7. A composition of claim 1 wherein the nickel catalyst constitutes about 0.05 to about 0.2 percent by weight of the polymer.

8. A composition of claim 1 wherein the solvent constitutes about 39 to about 69 percent by weight of the composition.

9. A composition of claim 1 containing about 12 to about 17 percent by weight of the polymer of a non-polymeric diisocyanide.

10. A cross-linkable film-forming composition consisting essentially of:
    (1) about 30 to about 60 percent by weight of said composition of a soluble polymer having a number average molecular weight of about 1500 to about 25,000, said polymer containing at least about 3 to 6 isocyano groups per polymer chain;
    (2) about 0.05 to about 0.2 percent by weight of the polymer of a nickel catalyst selected from the group consisting of nickel (II) salts, nickel (O) complexes and nickel (II) complexes; and
    (3) about 39 to about 69 percent by weight of the composition of an organic solvent for said polymer.

11. A composition of claim 10 wherein the soluble polymer is a copolymer of styrene, butyl acrylate, butyl methacrylate, or a combination thereof, with an isocyano-substituted methacrylate.

12. A composition of claim 10 wherein the nickel catalyst is a nickel (O) complex.

13. A composition of claim 10 containing about 12 to about 17 percent by weight of the polymer of a non-polymeric diisocyanide.

* * * * *